J. D. DUNN.
Cotton Chopper.

No. 100,128.             Patented Feb. 22, 1870.

UNITED STATES PATENT OFFICE.

JOHN D. DUNN, OF GRIFFIN, GEORGIA.

IMPROVEMENT IN COMBINED COTTON CHOPPER AND CULTIVATOR.

Specification forming part of Letters Patent No. 100,128, dated February 22, 1870.

*To all whom it may concern:*

Be it known that I, JOHN D. DUNN, of Griffin, in the county of Spalding, and in the State of Georgia, have invented certain new and useful Improvements in Combined Cotton Chopper and Cultivator; and I do hereby declare that the following is a full, clear, and exact description thereof, reference being had to the accompanying drawings, and to the letters of reference marked thereon, making a part of this specification.

The nature of my invention consists in the construction and arrangement of combined cotton chopper and cultivator, as will be hereinafter fully set forth.

In order to enable others skilled in the art to which my invention appertains to make and use the same, I will now proceed to describe its construction and operation, referring to the annexed drawings, in which—

Figure 1:
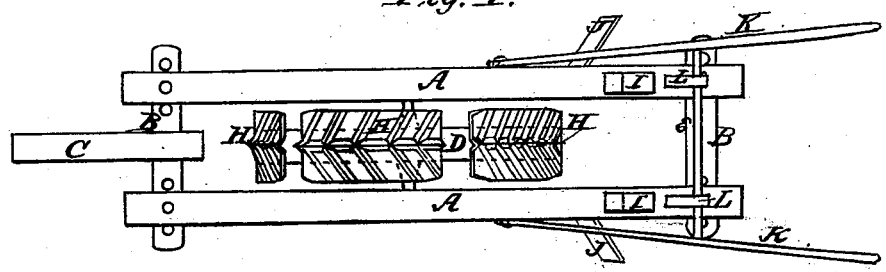
Figure 2:
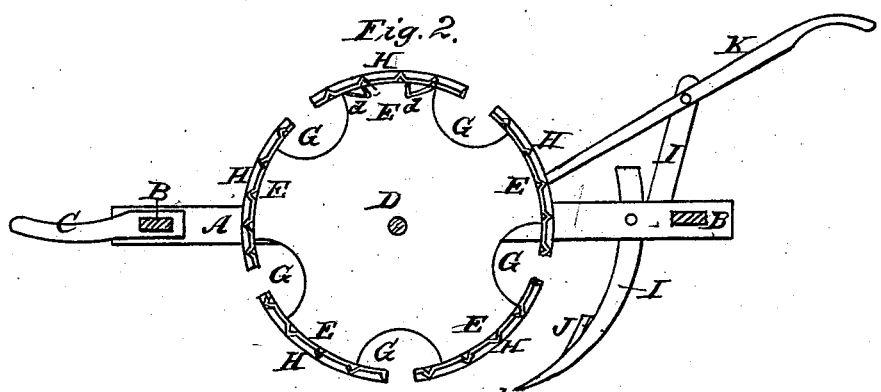
Figure 3:
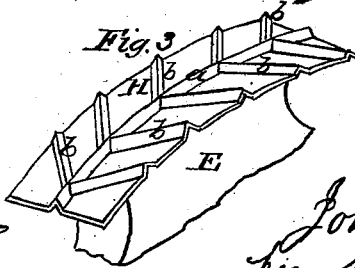

Figure 1 is a plan view of my machine. Fig. 2 is a side elevation of the same, one side bar being removed; and Fig. 3 is an enlarged perspective view of one of the hoes.

A A represent two bars of suitable length, having mortises cut through them near both ends, and through these mortises are passed cross-bars B B, which are provided with several holes for the insertion of pins to secure them in the side bars, A A. By changing the pins it will be seen that the side bars, A A, can be brought closer together or farther apart, as may be desired, for a purpose that will be hereinafter described.

In the center of one of the end bars, B, is secured a tongue, C, for attaching the horse.

In suitable journal-boxes in the side bars, A A, is pivoted a wheel, D, constructed in any suitable manner, so as to have a series of arms, E E, with spaces G G between them, as seen in Fig. 2.

Upon the outer ends of the arms E E are secured hoes H H, constructed in the following manner: Each hoe forms the arc of a circle with the same radius as the outer circumference of the arms E E, and has a sharp ridge, *a*, running longitudinally in the center its entire length, and from this central ridge smaller ridges *b b* run diagonally to its edges, as seen in Fig. 3. On the under side of the hoe H are inclined wedges *d d*, which are inserted in dovetailed grooves in the outer edge of the arms E, and by this means the hoes can be readily put on and taken off at pleasure. When the hoes are in this manner put on, there will be a space left between the ends of the hoes, as seen in Figs. 1 and 2, and when the machine is in operation the hoes H H will chop off or destroy all the cotton with which the sharp ridges *a* and *b b* come in contact, leaving only so much of the cotton as comes up between the ends of the hoes in the spaces G G. Owing to the different quality of the land, the spaces between the ends of the hoes will have to be made larger or smaller, so as to allow more or less of the cotton to remain standing; and for this reason I have hoes of different lengths, which can readily be substituted for those on the wheel. By this means I can make the space as large or as small as may be desired; or I may entirely close up every other space, if the richness of the ground should make such a course necessary. It will readily be understood that the richer the ground the smaller the spaces will have to be.

In rear of the wheel D, in each of the side beams, A, is passed a plow-shank, I, the lower ends of which are either provided with or shaped as a shovel-plow, and a suitable distance above said plow-point a wing, J, extends outward, said wings being inclined upward. Handles K K are also attached to the outside of the side beams, A A, and are connected by means of a rod, *e*, to the upper ends of standards L L, which are secured on the side beams. The plows I I and wings J J cover up the crippled cotton and hill up the standing cotton, and to regulate the depth at which the same are to work they are made adjustable in the side beams, so as to be raised up or lowered at pleasure. These plows may also be thrown closer to or farther from the center wheel, D, by changing the distance between the rear ends of the side beams, A A, as before described, the distance between their front ends being changed in the reverse manner, so as to always maintain the same distance at the center of the beams, where the wheel is placed.

This chopper and cultivator can be used on any kind of ground, such as hilly ground or when full of stumps, as well as on even ground.

Having thus fully described my invention, what I claim as new, and desire to secure by Letters Patent, is—

1. The hoes H H, constructed as described, with a sharp ridge, *a*, running longitudinally in the center, and other ridges, *b b*, from the center ridge to the edges, substantially as and for the purposes herein set forth.

2. The wheel D, provided with arms E E, leaving spaces G G between them, and said arms provided with movable hoes H H, constructed as described, and operating substantially as and for the purposes herein set forth.

In testimony that I claim the foregoing I have hereunto set my hand this 8th day of February, 1870.

JOHN D. DUNN.

Witnesses:
A. N. MARR,
J. M. WILLIAMS.